J. A. Joyner,
Car Spring.

No. 97,928.  Patented Dec. 14, 1869.

2 Sheets, Sheet 1.

Attest: A. Moore, N. S. Miller

Inventor: J. A. Joyner
his Attorney

United States Patent Office.

JAMES A. JOYNER, OF NEW YORK, N. Y.

Letters Patent No. 97,928, dated December 14, 1869.

---

IMPROVEMENT IN RUBBER SPRINGS FOR USE IN SHIPS, CARS, AND FOR OTHER PURPOSES.

---

The Schedule referred to in these Letters Patent and making part of the same.

---

*To all whom it may concern:*

Be it known that I, JAMES A. JOYNER, of the city, county, and State of New York, have invented a new and useful Improvement in Rubber Springs to be applied for relieving sudden jerks or strains in the chains or ropes used in ships for steering, in draught-chains, and in similar positions where a spring is required, which will yield a certain distance without impairing the full strength of the cable, chain, rope, or other connection in which it may be inserted.

In the annexed drawings—

The following explanation will enable any one to make and use my invention.

The size of the spring will be, in each case, modified to suit the application to which it is to be made.

Figure 2:
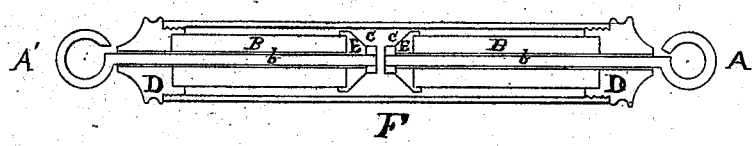
Figure 2 is a longitudinal section of the same.
Figure 1:
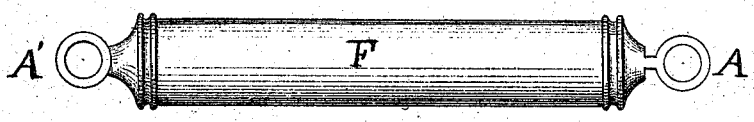
Figure 1 is a perspective view of a spring made according to my invention.

The sectional view in fig. 2 shows all the parts of a spring made according to my invention.

Figure 3:
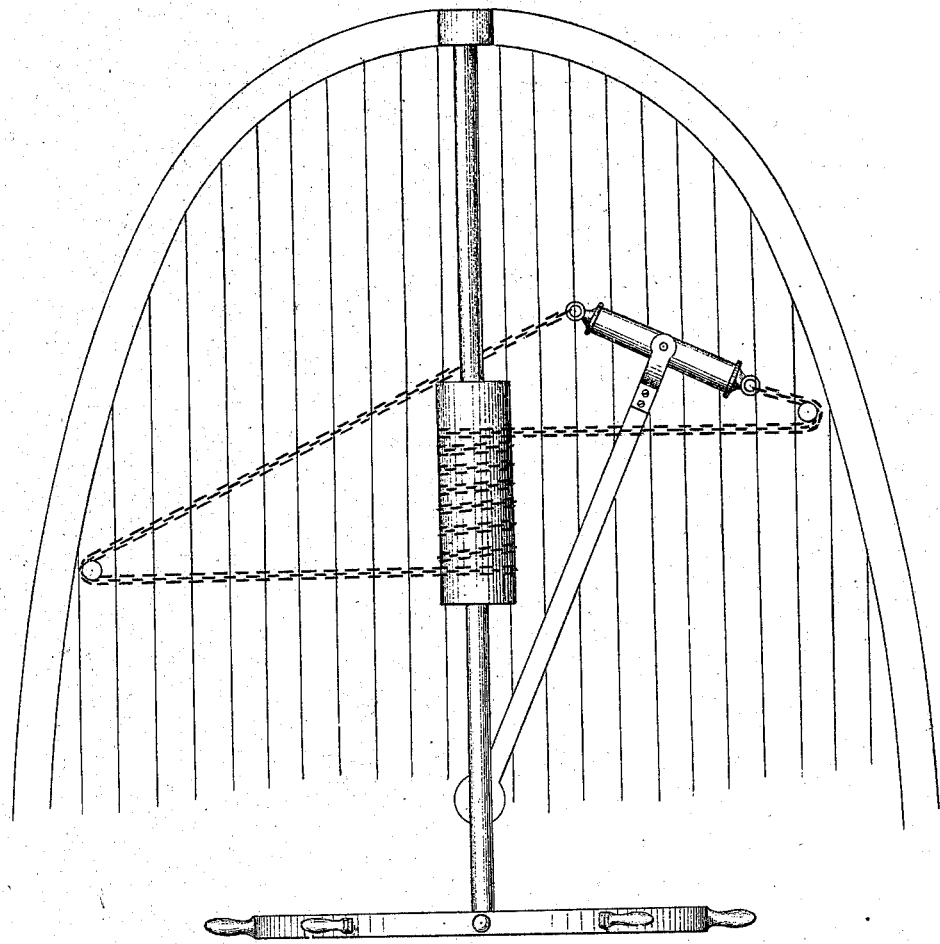
Figure 3 shows the mode of applying such spring in relieving the jerk or strain on the cables, ropes, or tackle used in working a ship's rudder or standing rigging.

The loops or rings A A' serve to connect the spring with a chain, as in fig. 3.

The rods $b$ $b'$ pass through the vulcanized rubber springs B B', and have nuts or heads, $c$ $c$, holding caps, E E', against the ends of the rubber springs.

The springs B B' are inserted in the head-pieces D D', which are fastened by male and female screws to the barrel or case F, which encloses and connects the whole.

This case must be made larger in diameter than the rubber springs B B', so as to leave a space between the springs and the case, in order to permit the compression of the springs by tension on the loops A A' and rod $b$ $b'$.

I have described the barrel F as containing two springs, B B', but a very good spring may be made by using only one piece of rubber, B, with rod $b$ of sufficient length to fill the barrel. In this case, the other loop is attached to the opposite cap D'.

By the construction of my spring, it serves at the same time as a spring and as a swivel.

For the loops A A' may be substituted hooks, or other connecting devices.

My invention is found of great value on the chains, cables, stays, rigging, and the like, used in ships.

Also, in draught-chains, links, and the like, in railroad and other cars and vehicles.

Having thus described my invention,

What I claim, and desire to secure by Letters Patent of the United States, is—

1. The improved spring, herein described, composed of the parts A, B, $b$, $c$, D, E, and F, or their equivalents, combined and arranged, substantially as described.

2. The combination of the spring, herein described, with a chain, cable, or the like, in the manner and for the purpose set forth.

J. A. JOYNER.

Witnesses:
 T. DELTENRE,
 C. HAVARD.